US012339028B2

United States Patent
Ernest

(10) Patent No.: US 12,339,028 B2
(45) Date of Patent: *Jun. 24, 2025

(54) HEAT TRANSFER SYSTEM AND ENVIRONMENTAL CONTROL SYSTEM WITH HEAT TRANSFER SYSTEM

(71) Applicant: Omachron Intellectual Property Inc., Hampton (CA)

(72) Inventor: Wayne Conrad Ernest, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/310,350

(22) Filed: May 1, 2023

(65) Prior Publication Data

US 2023/0266035 A1     Aug. 24, 2023

Related U.S. Application Data

(63) Continuation of application No. 17/342,394, filed on Jun. 8, 2021, now Pat. No. 11,686,498, which is a
(Continued)

(30) Foreign Application Priority Data

Aug. 1, 2018 (CA) .................................. CA 3013005

(51) Int. Cl.
  *F24F 1/00*     (2019.01)
  *F24F 3/044*    (2006.01)
  (Continued)

(52) U.S. Cl.
  CPC ............ *F24F 11/871* (2018.01); *F24F 3/044* (2013.01); *F24F 3/06* (2013.01); *F24F 5/0046* (2013.01);
  (Continued)

(58) Field of Classification Search
  None
  See application file for complete search history.

(56) References Cited

U.S. PATENT DOCUMENTS 4,676,144 A      6/1987  Smith, III
5,772,501 A  *   6/1998  Merry ..................... F24F 3/044
                                                    454/229
(Continued)

FOREIGN PATENT DOCUMENTS

CA     2974457 A1  *  4/2014
JP     2004028484 A      1/2004

OTHER PUBLICATIONS

International Search Report and Written Opinion, received in connection to related international patent application No. PCT/CA2018/051033, mailed on Sep. 20, 2019.
(Continued)

*Primary Examiner* — Hien D Khuu
(74) *Attorney, Agent, or Firm* — Philip C. Mendes da Costa; SMART & BIGGAR LP

(57) ABSTRACT

An environmental control system comprises a fluid flow path which has a pump and circulates liquid to a first heat exchanger in a first room and to a second heat exchanger in a second room. The fluid flow path comprises a pump. A user inputs a target temperature for the first room via a first user interface that is located in the first room, which is communicated to the control unit and a sensor located in the room communicates the temperature in the first room to the control unit. A user inputs a target temperature for the second room via a second user interface that is located in the second room, which is communicated to the control unit and a sensor located in the room communicates the temperature in the second room to the control unit. The control is physically isolated from the user interfaces and temperatures sensors.

8 Claims, 11 Drawing Sheets

Related U.S. Application Data continuation of application No. 16/525,210, filed on Jul. 29, 2019, now Pat. No. 11,060,752.

(51) Int. Cl.

| | | |
|---|---|---|
| *F24F 3/06* | (2006.01) | |
| *F24F 5/00* | (2006.01) | |
| *F24F 11/46* | (2018.01) | |
| *F24F 11/871* | (2018.01) | |
| *F24F 13/30* | (2006.01) | |
| *G05B 15/02* | (2006.01) | |
| *F24F 11/00* | (2018.01) | |
| *F24F 110/10* | (2018.01) | |
| *F24F 110/12* | (2018.01) | |

(52) U.S. Cl.
CPC .............. *F24F 11/46* (2018.01); *F24F 13/30* (2013.01); *G05B 15/02* (2013.01); *F24F 2003/0446* (2013.01); *F24F 2011/0002* (2013.01); *F24F 2110/10* (2018.01); *F24F 2110/12* (2018.01); *G05B 2219/2614* (2013.01)

(56) References Cited

U.S. PATENT DOCUMENTS

| | | | |
|---|---|---|---|
| 5,858,041 | A | 1/1999 | Luetkemeyer |
| 7,308,906 | B2 | 12/2007 | Sinclaire |
| 8,442,694 | B2 | 5/2013 | Jang |
| 10,242,129 | B2 | 3/2019 | Flaherty et al. |
| 2001/0025349 | A1 | 9/2001 | Sharood et al. |
| 2004/0137836 | A1 | 7/2004 | Bjordal |
| 2004/0147217 | A1 | 7/2004 | Peterson et al. |
| 2010/0076605 | A1 | 3/2010 | Harrod et al. |
| 2010/0323604 | A1 | 12/2010 | Duffe |
| 2012/0022702 | A1 | 1/2012 | Jang |
| 2013/0338837 | A1* | 12/2013 | Hublou .............. G05D 23/1923 700/278 |
| 2014/0001977 | A1* | 1/2014 | Zacharchuk ............ H02J 50/80 323/318 |
| 2014/0223939 | A1* | 8/2014 | Nasuta .................... F25B 30/02 62/160 |
| 2016/0025578 | A1* | 1/2016 | Meirav .................. G01K 17/06 374/40 |
| 2016/0033145 | A1* | 2/2016 | Logan .................. F24D 10/003 62/238.7 |
| 2016/0131385 | A1 | 5/2016 | Poplawski et al. |
| 2016/0209062 | A1 | 7/2016 | Castillo et al. |
| 2016/0211985 | A1 | 7/2016 | Castillo et al. |
| 2016/0215996 | A1 | 7/2016 | Blair et al. |
| 2017/0284691 | A1 | 10/2017 | Sinha et al. |
| 2018/0004178 | A1 | 1/2018 | Haines et al. |
| 2018/0087796 | A1 | 3/2018 | Blair et al. |
| 2019/0364410 | A1 | 11/2019 | Schmidlin et al. |
| 2020/0132326 | A1 | 4/2020 | Quistad et al. |
| 2023/0266034 | A1 | 8/2023 | Conrad |

OTHER PUBLICATIONS

International Preliminary Report on Patentability, received in connection to related international patent application No. PCT/CA2018/051033, mailed on Feb. 11, 2021.

English machine translation of JP2004028484A, published on Jan. 29, 2004.

\* cited by examiner

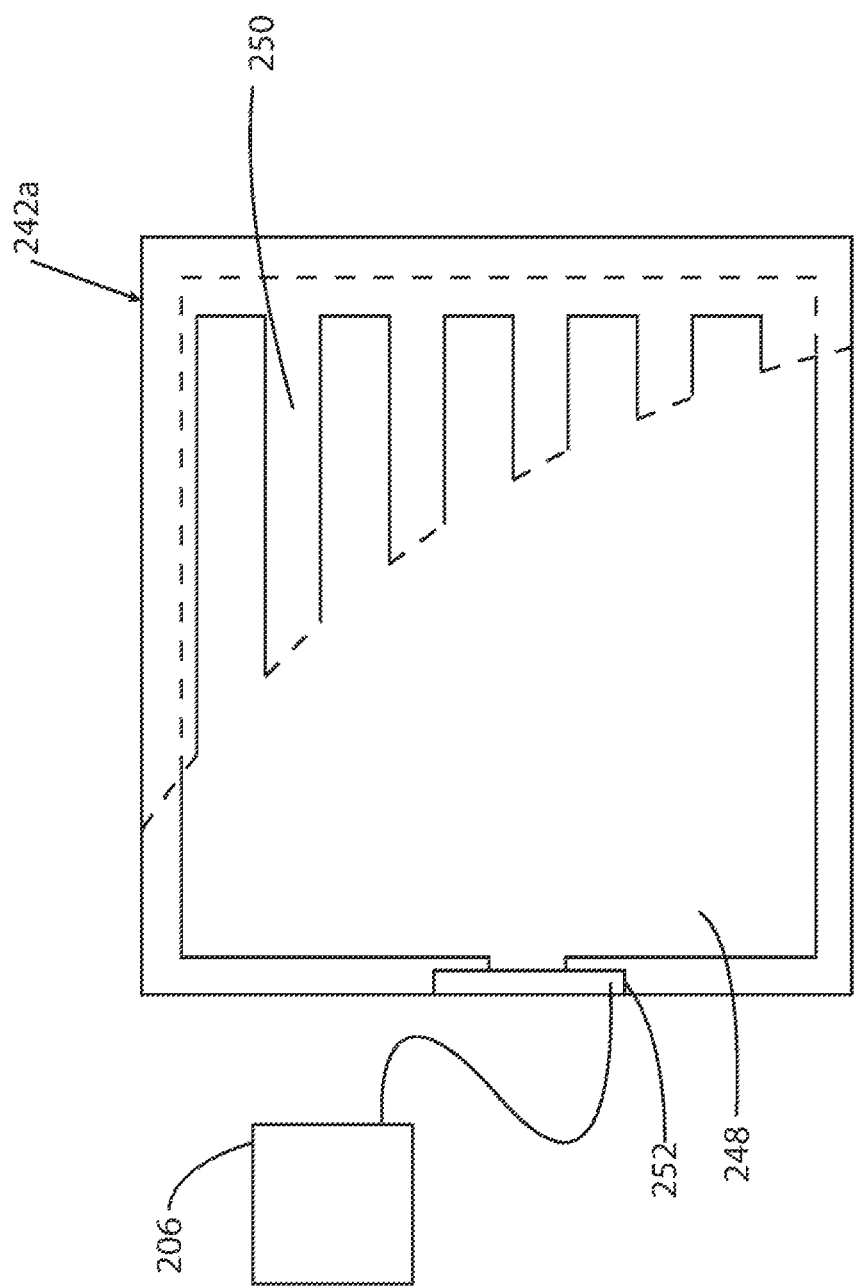

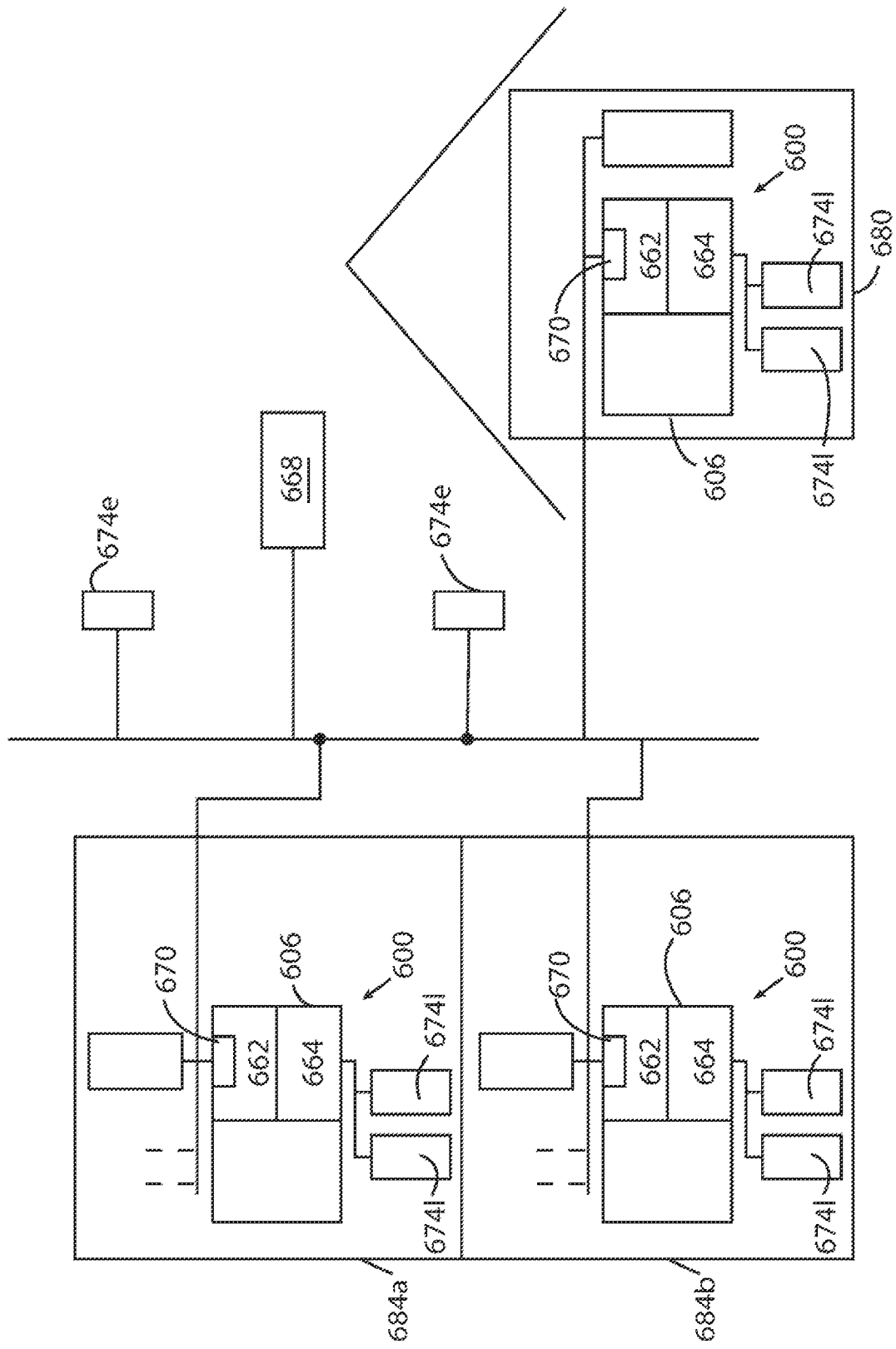

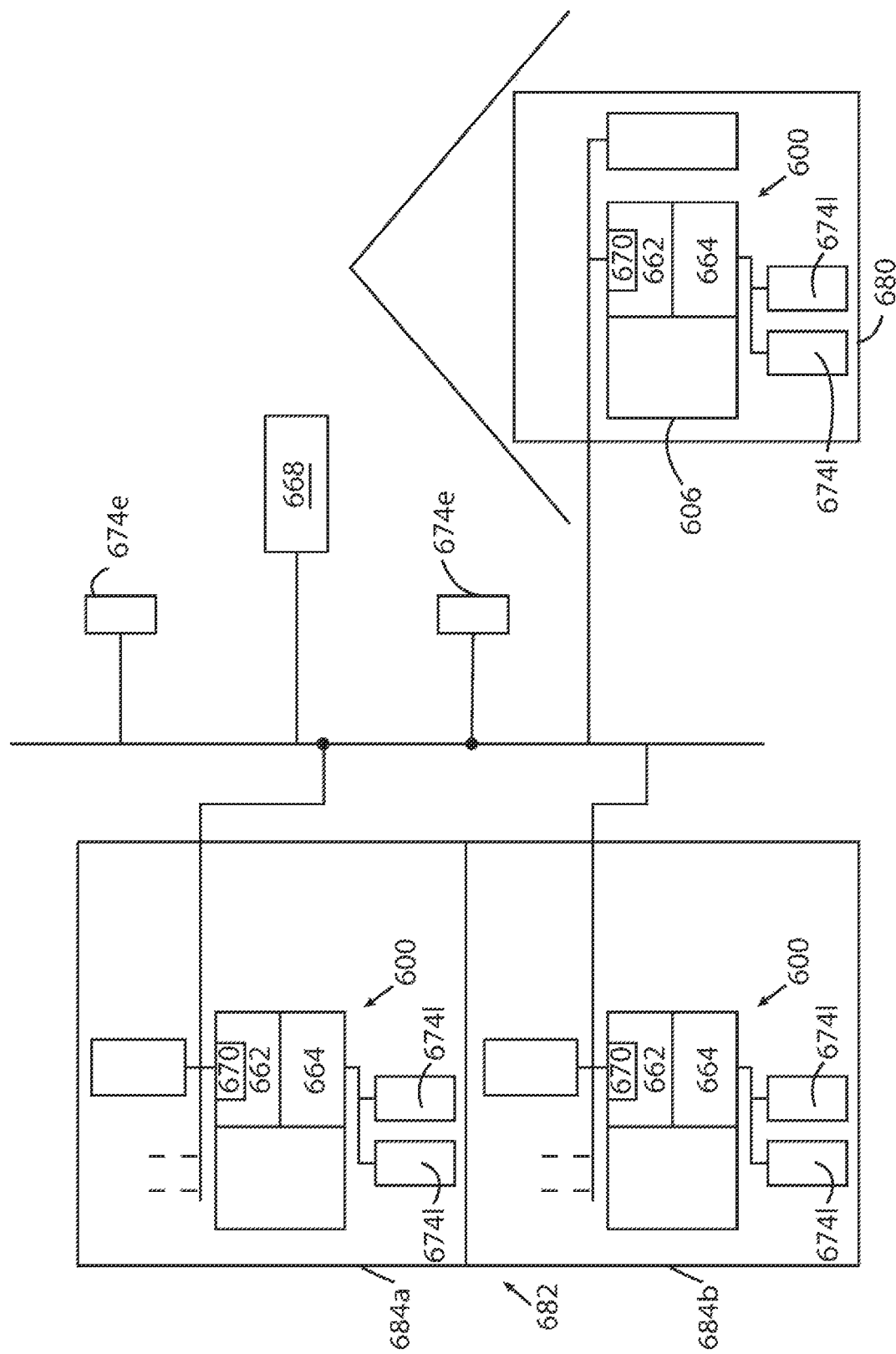

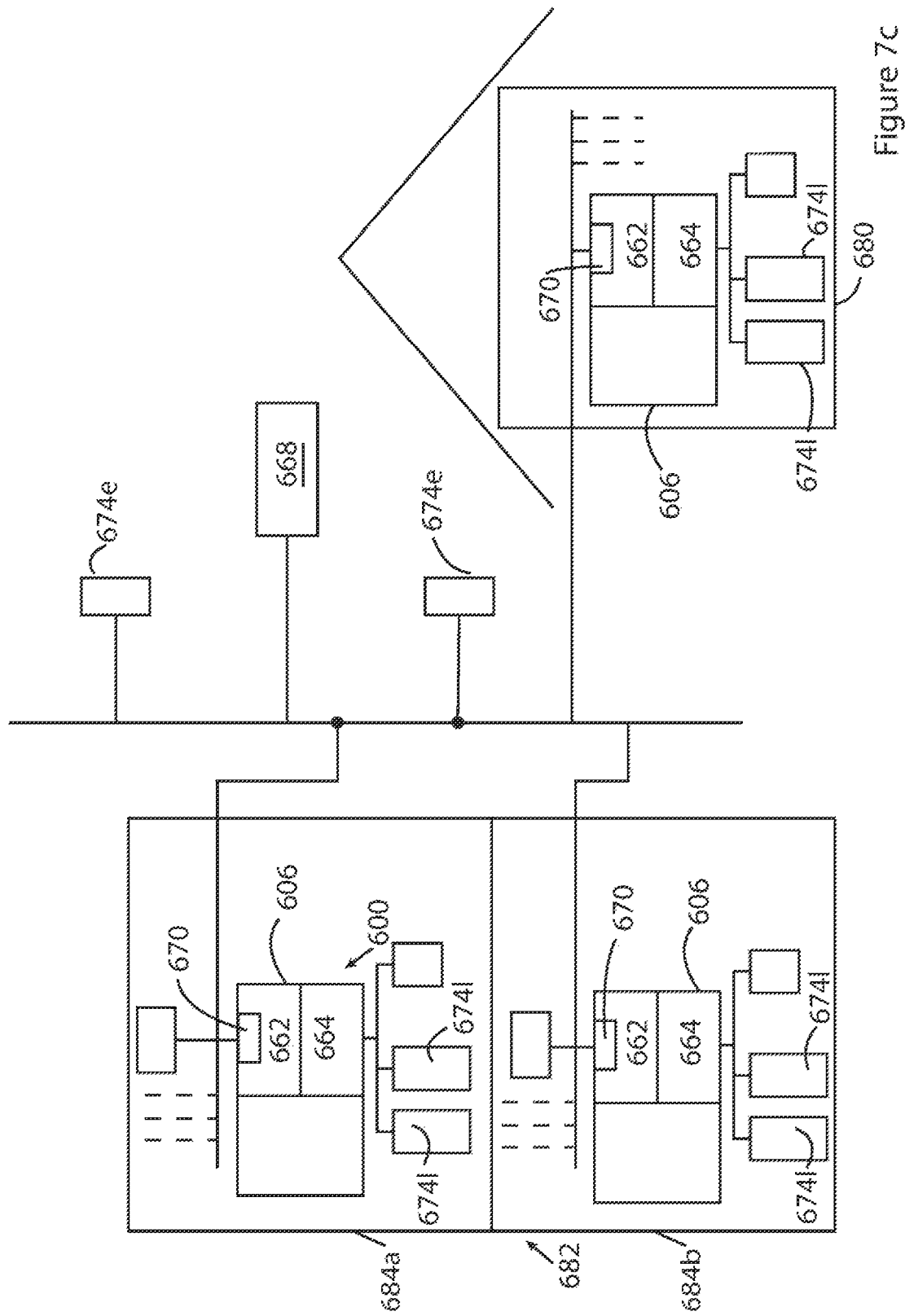

HEAT TRANSFER SYSTEM AND ENVIRONMENTAL CONTROL SYSTEM WITH HEAT TRANSFER SYSTEM

CROSS-REFERENCE TO RELATED APPLICATIONS

This application is a continuation of U.S. patent application Ser. No. 17/342,394, filed on Jun. 8, 2021, now allowed, which itself is a continuation of U.S. patent application Ser. No. 16/525,210, filed on Jul. 29, 2019, and issued as U.S. Pat. No. 11,060,752 on Jul. 13, 2021, which itself claims priority to Canadian Patent Application No. 3,013,005, filed on Aug. 1, 2018, the disclosure of which is incorporated herein by reference.

FIELD

The described embodiments relate to environmental control systems, and in particular, to systems for controlling the temperature of different locations within a structure by transferring heat from one location to another.

BACKGROUND

Conventional environmental control systems may experience certain disadvantages, such as distributing heated or cooled air throughout a structure unnecessarily, unevenly or consuming excessive energy when attempting to achieve selected temperatures in different locations within a structure. There is a need to improve such environmental control systems to reduce these and other disadvantages.

SUMMARY

In one aspect, at least one embodiment described herein provides an environmental control system for a structure, the environmental control system comprising: an HVAC system including an HVAC device and a primary distribution system having a supply end in thermal communication with the HVAC device and at least two primary HVAC registers in thermal communication with corresponding locations in the structure including a first HVAC register in a first location and a second primary HVAC register in a second location; an ambient energy distribution system extending between the first and second locations, wherein the ambient energy distribution system is fluidically separate from the primary distribution system; and a control unit coupled to the ambient energy distribution system to control transfer of heat between the first and second locations through the ambient energy distribution system.

In some embodiments, the ambient energy distribution system is fluidically isolated from the primary distribution system.

In some embodiments, the HVAC system includes an HVAC system energy moving member in fluid communication with the primary distribution system, and the ambient energy distribution system includes an ambient energy moving member operable independently of the first air moving member by the control unit to transfer energy between the first and second locations.

In some embodiments, the ambient energy distribution system includes ambient air ducting extending between the first and second locations and wherein the ambient energy moving member is an air blower, and wherein the ambient energy member is operable by the control unit to blow air between the first and second locations through the ambient air ducting.

In some embodiments, the ambient energy distribution system extends between at least three locations including the first and second location and wherein the ambient air ducting extends between the at least three locations and further including a controllable damper in the ambient air ducting between the first and second locations, wherein the controllable damper is coupled to the control unit and may be adjusted to regulate the transfer of heat energy between the first and second locations.

In some embodiments, the ambient energy distribution system extends between at least three locations including the first and second location and wherein the ambient air ducting extends between the at least three locations and further includes a controllable damper in the ambient air ducting between the first and second locations, wherein the controllable damper is coupled to the control unit and may be adjusted to fluidically isolate the third location from the first and second locations to substantially restrict airflow between the third location and the first and second locations.

In some embodiments, the ambient energy distribution system includes: fluid conduits extending between the first and second locations to carry a thermal fluid between the first and second locations; and an ambient heat exchanger in each location coupled to the fluid conduits to transfer heat energy between air in the location and the thermal fluid, wherein the ambient energy moving member is a fluid pump, and wherein the ambient energy member is operable by the control unit to transfer heat energy between the first and second locations by moving the thermal fluid through the fluid conduits.

In some embodiments, the first location is a first room in the structure and the second location is in a second room in the structure.

In some embodiments, the first location and the second location are different regions in the same room in the structure.

In some embodiments, the first location is a higher region in the room and the second location is a lower region in the room.

In some embodiments, the environmental control system further comprises a first environmental sensor in the first location and a second environmental sensor in the second location, and wherein each environmental sensor is coupled to the control unit to provide ambient environmental information to the control unit corresponding to the respective location in which the environmental sensor is located.

In some embodiments, each environmental sensor includes a temperature sensor and wherein the control unit receives ambient temperature information from each environmental sensor reporting an ambient temperature in the respective location in which the environmental sensor is located.

In some embodiments, the environmental control system further comprises a first user interface for receiving a target temperature for the first location and the second location.

In some embodiments, the environmental control system further comprises a first user interface for receiving a target temperature for the first location and a second user interface for receiving a target temperature for the second location.

In some embodiments, the control unit is configured with a target temperature for the first location and with a target temperature for the second location.

In some embodiments, the ambient energy moving member is actuated in response to an actuation condition.

In some embodiments, the actuation condition includes at least one of the following conditions: the ambient temperatures in the first and second locations differ by a selected temperature difference; the ambient temperature in the first location is higher than the target temperature for the first location; the ambient temperature in the second location is lower than the target temperature for the second location; and the ambient temperature in the first location is higher than the target temperature for the first location and the ambient temperature in the second location is lower than the target temperature for the second location.

In some embodiments, the actuation condition includes one or more of the following conditions: the ambient temperature in the first location is higher than the target temperature for the first location; the ambient temperature in the second location is lower than the target temperature for the second location; and the ambient temperature in the first location is higher than the target temperature for the second location, wherein actuating the ambient energy moving member results in heat energy from the first location being transferred to the second location.

In some embodiments, the actuation condition includes one or more of the following conditions: the ambient temperature in the first location is lower than the target temperature for the first location; the ambient temperature in the second location is higher than the target temperature for the second location; and the ambient temperature in the first location is lower than the target temperature for the second location, wherein actuating the ambient energy moving member results in cooler air from the first location being transferred to the second location.

In some embodiments, the control unit comprises: a control unit coupled to the HVAC device and the ambient energy distribution system; a system communication interface that provides a first secure communication interface for remote devices, wherein the system communication interface includes a firewall to prevent unauthorized devices from accessing the control unit; and a local communication interface to provide a secure communication interface for local user devices.

In some embodiments, the local communication interface operates using a selected local communication protocol and wherein the local communication interface is secured by applying a security protocol corresponding to the selected local communication protocol.

In some embodiments, the local communication interface operates using a local communication protocol selected from the group consisting of: WiFi, Bluetooth, Bluetooth LE, ZigBee and WiMax, and wherein the local communication interface is secured by applying a security protocol corresponding to the selected local communication protocol.

In some embodiments, the environmental control system further comprises a system monitor coupled to the control unit through the system communication interface and the firewall.

In another aspect, at least one embodiment described herein provides a system for controlling the ambient environment in a plurality of units in a structure, the system including: an environmental control system installed in each of at least some of the units wherein each environmental control system includes: an HVAC system including an HVAC device and a primary distribution system having a supply end in thermal communication with the HVAC device and at least two primary HVAC registers in thermal communication with corresponding locations in the structure including a first primary HVAC register in a first location and a second primary HVAC register in a second location; an ambient energy distribution system extending between the first and second locations, wherein the ambient energy distribution system is fluidically separate from the primary distribution system; and a control unit coupled to the ambient energy distribution system to control transfer of heat between the first and second locations through the ambient energy distribution system, the control unit comprising a system communication interface, a system monitor coupled to each respective environmental control system to receive data regarding the operation of each respective environment control system.

In some embodiments, each control unit includes a firewall and the system monitor is coupled to each respective control unit through the respective firewall.

In some embodiments, the system monitor is configured to control the operation of each environmental control unit.

In some embodiments, the system monitor is configured to coordinate the operation of at least some of the environmental control units.

In some embodiments, each environmental control system includes an HVAC system and an ambient energy distribution system, and wherein the system monitor is configured to selectively limit the operation of HVAC systems in one or more environmental control systems.

In some embodiments, each environmental control system includes an HVAC system and an ambient energy distribution system, and wherein the system monitor is configured to, in a sequential order, limit the operation of HVAC systems in a first group of one or more environmental control systems, and then limit the operation of HVAC system in a second group of one or more environmental control systems.

In another aspect, at least one embodiment described herein provides a control unit for an environmental control system comprising: a controller; a system communication interface that provides a first secure communication interface for remote devices, wherein the system communication interface includes a firewall to prevent unauthorized devices from accessing the control unit; and a local communication interface to provide a secure communication interface for local user devices.

In some embodiments, the local communication interface operates using a selected local communication protocol and wherein the local communication interface is secured by applying a security protocol corresponding to the selected local communication protocol.

In some embodiments, the local communication interface operates using a local communication protocol selected from the group consisting of: WiFi, Bluetooth, Bluetooth LE, ZigBee and WiMax, and wherein the local communication interface is secured by applying a security protocol corresponding to the selected local communication protocol.

In some embodiments, the external communication interface is adapted to allow the control unit to communicate with a plurality of HVAC system devices.

It will be appreciated that any aspect disclosed herein may be used with one or more of the other aspects disclosed herein and any feature of any embodiment of any aspect may be used with one or more features of any embodiment of any one or more of the other aspects.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from the detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

FIGS. 3a, 3b and 3c illustrate a vent with an integrated damper that may be used with various embodiments of environmental control systems;

FIGS. 7a, 7b and 7c illustrate various configurations of multiple environmental control systems coupled to a system monitor and one or more user interfaces.

Figure 1:
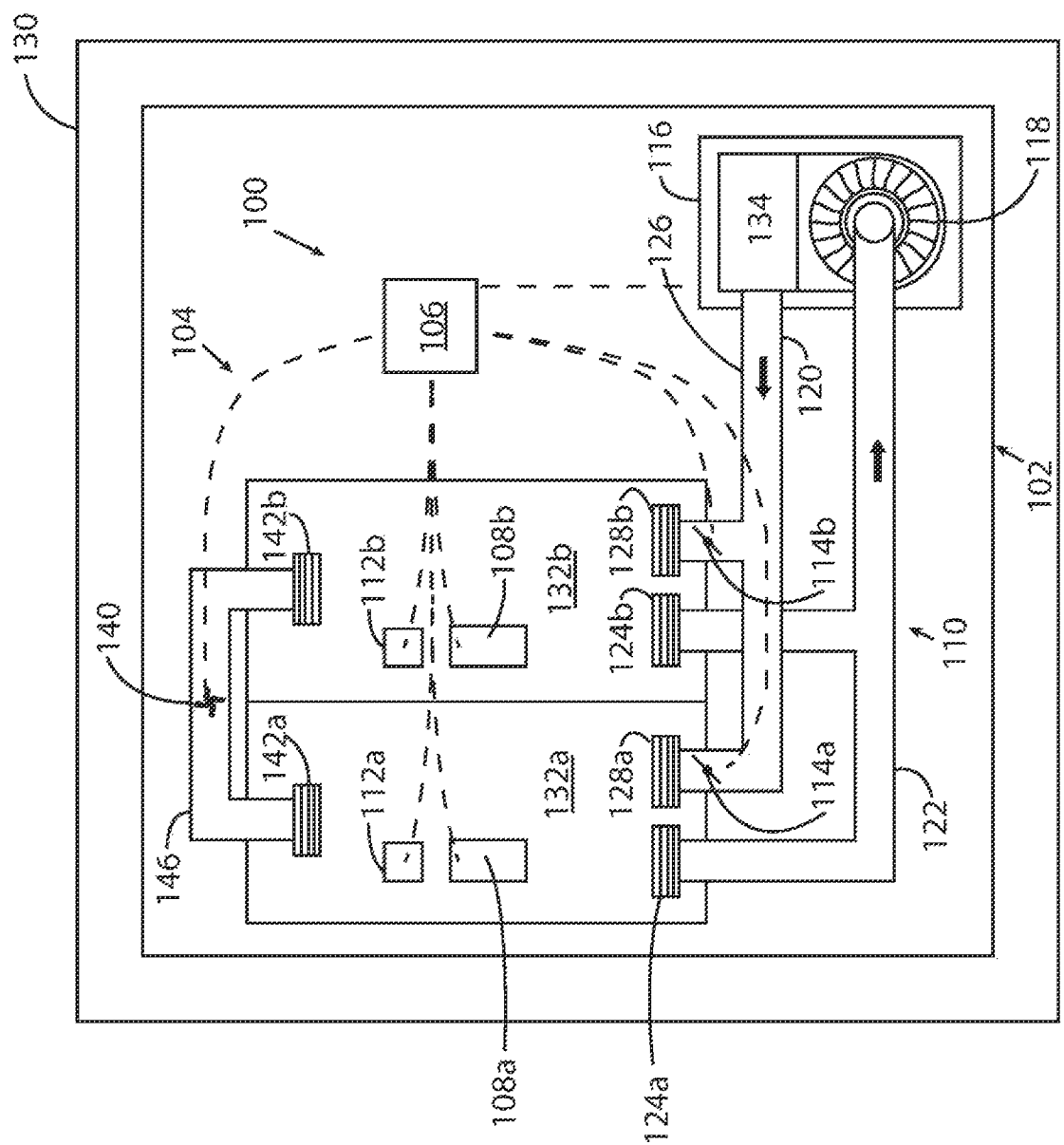
FIG. 1 illustrates a first environmental control system for distributing or transferring heat between locations.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXAMPLE EMBODIMENTS

Various apparatuses or processes will be described below to provide an example of various embodiments of the claimed subject matter. No embodiment described below limits any claimed subject matter and any claimed subject matter may cover processes, apparatuses, devices, or systems that differ from those described below. The claimed subject matter is not limited to apparatuses, devices, systems, or processes having all of the features of any one apparatus, device, system, or process described below or to features common to multiple or all of the apparatuses, devices, systems, or processes described below. It is possible that an apparatus, device, system, or process described below is not an embodiment of any claimed subject matter. Any subject matter that is disclosed in an apparatus, device, system, or process described below that is not claimed in this document may be the subject matter of another protective instrument, for example, a continuing patent application, and the applicants, inventors, or owners do not intend to abandon, disclaim, or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. Figures illustrating different embodiments may include corresponding reference numerals to identify similar or corresponding components or elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, as used herein, the terms "coupled" or "coupling" can indicate that two elements or devices can be directly coupled to one another or indirectly coupled to one another through one or more intermediate elements or devices via an electrical element, electrical signal, or a mechanical element such as but not limited to, a wire or cable, for example, depending on the particular context. Elements and devices may also be coupled wireless to permit communication using any wireless communication standard. For example, devices may be coupled wirelessly using Bluetooth communication, WiFi or another standard or proprietary wireless communication protocol.

It should be noted that terms of degree such as "substantially", "about", and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments disclosed herein generally relate to environmental control systems. In particular, the various embodiments described herein relate to systems for controlling the temperature of different locations within a structure by recirculating heat from one location to another.

Reference is first made to FIG. 1, which illustrates an environmental control system 100 according to an example embodiment. System 100 includes an HVAC system 102, an ambient energy distribution system 104, a control unit 106, one or more user interfaces 108 and one or more environmental sensors 112.

HVAC system 102 includes a HVAC device 116 and a primary distribution system 110. HVAC device 116 may be any HVAC device known in the art which provides heating and or cooling. For example, HVAC device 116 may include a combination of a heating element and an evaporator coil 134 and a first blower 118. Primary distribution system 110 may be any distribution system to distribute treated air exiting a HVAC device 116 to one or more locations in a building as is known in the art and accordingly may include supply ducting 120 and return air ducting 122. In this embodiment, HVAC device is a combination heating and air conditioning system, and may include additional elements such as refrigerant lines, a condensing coil and a condenser. In other embodiments, the HVAC device may be a furnace, heat pump, heat recovery ventilator (HRV), energy recovery ventilator (ERV), an air conditioner (AC) or a combination of heating, ventilation and air conditioning (HVAC) devices. Ducting 120 has a HVAC or supply end 126 in fluid communication with the HVAC device and a plurality of primary HVAC registers or vents 128. Register 128a is in a first location 132a and register 128b is in a second location 132b.

Locations 132 may, for example, be different rooms or areas in structure 130. In some instances, locations 132 may be partially, substantially or completely fluidically isolated from one another. For example, different rooms in a large house or office building may be substantially fluidically isolated, even if the rooms can be opened into a shared network of corridors or halls. The fluidic isolation of a location or locations may be changed, for example, by changing settings of HVAC vents (including return air vents), or by opening or closing doors or windows. In other instances, locations 132 may be physically spaced regions that are in fluid communication with one another, allowing air to be easily mixed between the different locations.

Return ducting 122 has a plurality of return air vents 124 which are positioned in locations 132a, 132b. Return air ducting 122 carries air from air vents 124 to the blower 118 in HVAC device 116.

A first user interface 108a and a first environmental sensor 112a are positioned in first location 132a and are coupled to a control unit 106. Similarly, a second user interface 108b and a second environmental sensor 112b are positioned in second location 132b, and are also coupled to control unit 106. User interfaces 108 provide an interface for a user to provide settings (such as a target temperature) to system 100 and to receive information from system 100. For example, a user interface 108 may provide a dial, switches, touchscreen or other means to allow a user to enter a target ambient temperature for the respective location in which a particular user interface 108 is located, and, optionally, for other locations. A user interface may also report information such as the current target temperature, current ambient temperature, ambient humidity and operating mode or conditions of system 100. Environmental sensors 112 sense ambient conditions in a location. Typically, an environmental sensor may include an ambient temperature sensor. Some environmental sensors may include a humidity sensor, an air pressure sensor, a light sensor, a sunlight sensor and other types of sensors. In system 100, each environmental sensor 112 includes a temperature sensor that senses the ambient temperature in its respective locations and provides a temperature signal containing ambient temperature information corresponding to the measured ambient temperature to control unit 106.

Control unit 106 can be coupled wirelessly, by wired connection, or both with various devices to permit communication with the devices, including, but not limited to, user interfaces, environmental sensors, blowers, fans, dampers, pumps, heaters, radiators, ventilators, air conditioners, and other devices in the system.

Control unit 106 is operable to receive ambient temperature information from each of environmental sensor 112a and second environmental sensor 112b. HVAC device 116 operates under the control of control unit 106, which may send heating signals, cooling signals, ventilation signals and other HVAC system control signals to activate different operating modes of HVAC device 116.

For example, HVAC device 116 may operate in a heating mode in response to a heating signal from control unit 106, in response to a heating signal from control unit 106, HVAC device 116 may switch on blower 118, which draws air from structure 130 through return air ducts 122 and blows the air through a heating element 134. Supply end 126 receives heated air from HVAC device 116. The heated air is forced through ducts 120 by a first blower 118 and exits ducts 120 into the various rooms or locations 132 in structure 130 through registers 128. In this manner all locations 132 may be heated.

Similarly, HVAC device 116 may operate in a cooling mode in response to a cooling signal from control unit 106, in which an air conditioning system (not shown), which may be integrated into HVAC device 116 is operational.

Similarly, HVAC device 116 may operate in a ventilation mode in response to a ventilation signal, in which blower 118 may be operational, but the heating element 134 and air conditioning system are not operational.

Various HVAC devices may have other elements assembled with or into them to provide other functions such as heat recovery or energy recovery. It will be appreciated that HVAC device 116 may be an ERV device and may draw air from the exterior of a building and may exhaust air to the exterior of the building.

Ambient energy distribution system 104 extends between first location 132a and second location 132b in structure 130, and allows for transfer of heat energy between the locations. In this embodiment, ambient energy distribution system 104 provides an airflow path between the locations, allowing relatively warm or relatively cool air to be transferred from one location to the other, thereby changing the distribution of heat energy between the locations. Ambient energy distribution system 104 has a first vent 142a in first location 132a and a second vent 142b in second location 132b. The vents 142 are connected by ambient air ducting 146. Ambient energy distribution system 104 has an ambient energy moving member 140. In this embodiment, the ambient energy moving member is an ambient air fan or ambient air blower 140 operable independently of first blower 118. Ambient air 140 is located between first vent 142a and second vent 142b. It will be appreciated that ambient energy distribution system 104 may extend between more than two locations, it may have more than one ambient air moving member and it may have more than one outlet in a room and/or more than one inlet in a room.

Ambient energy distribution system 104 is fluidically separate from the HVAC system 102. As exemplified, the ducting for ambient energy distribution system 104 is physically separate from the ducting for HVAC system 102. It will be appreciated that HVAC system 102 and ambient energy distribution system 104 may share some common ducting. In such a case, the shared portion of the ducting (which would then be part of both primary distribution system 110 and ambient energy distribution system 104) may be physically isolated from the remaining portion of the ducting of primary distribution system 110 when ambient energy distribution system 104 is in use or the remaining portion of the ducting of ambient energy distribution system 104 when primary distribution system 110 is in use by any means known in the art such as a closeable damper at the terminal ends of the shared portion of the ducting.

Ambient energy distribution system 104 is capable of transferring heat between locations 132a and 132b independently of HVAC system 102 and the operation of HVAC device 116. Ambient air blower 140 may be operated bidirectionally (i.e. in either direction at any particular time) to blow air in ducting 146 from first location 132*a* to second location 132*b* or from second location 132*b* to first location 132*a*.

Control unit 106 is coupled to and controls the operation of ambient air ambient air blower 140, including its speed and direction of operation. Ambient air blower 140 will typically be operated to blow heated or cooled air from first location 132*a* to 132*b* or vice versa upon the existence of an actuation condition.

For example, an actuation condition may relate to the availability of excess heat energy in one location and a demand for heat in another location. For example, if:
 (i) the ambient temperature in room 132*a* (as sensed by environmental sensor 112*a* and reported to control unit 106) is higher than the target temperature for room 132*a* (as set by a user at a user interface 108); and/or
 (ii) the ambient temperature in room 132*b* is lower than the target temperature for room 132*b*, and/or
 (iii) the ambient temperature in room 132*a* is higher than the target temperature for room 132*b*,
then control unit 106 may activate ambient air blower 140 to blow air from location 132*a* to location 132*b*, thereby blowing relatively warm air from location 132*a* to location 132*b*. Air may flow out of location 132*b* and similarly air may blow into location 132*a* to maintain air pressure in the respective locations. For example, air may flow into or from a hallway between the locations, through the ducting 120 of the HVAC system 102, or otherwise into areas or locations that are in fluid communication with locations 132.

Other actuation conditions may relate to the difference in the ambient temperature between the first and second locations exceeding a user set or predetermined threshold; the ambient temperature in a location being higher than a target temperature for that location; the ambient temperature in a location being lower than a target temperature for that location; or a combination of these and other conditions.

Control unit 106 may coordinate the operation of the HVAC system and the ambient energy distribution system 104 in response to user settings provided at the user interfaces and ambient temperature conditions.

Control unit 106 may continue the operation of ambient air blower 140 and of HVAC device 116 until the actuation condition(s) that initiated their respective or coordinated operation no longer exists, until a different condition exists, for a minimum time period, for a maximum time period or based on a combination of such criteria.

HVAC system 102 may include one or more optional dampers 114 that may restrict the flow of heated air through HVAC system 102 to first location 132*a* or second location 132*b*. In the illustrated embodiment, first damper 114*a* can restrict airflow to first location 132*a* and second damper 114*b* can restrict airflow to second location 132*b*. Control unit 106 may be coupled to dampers 114 and may actuate them to allow full airflow to a location, no airflow to a location or an intermediate amount of airflow to the location, by rotating or otherwise configuring the dampers to open, partially open, partially close or close a portion of the ducting. When HVAC device 116 is active, air can be selectively blown into one or both locations 132*a*, 132*b* at variable rates depending on the damper configurations (and also depending on the amount of heated or cooled air generated in the HVAC device and the speed of blower 116).

In some embodiments, a structure may have a user interface that is used to set a target temperature for multiple locations within the structure. For example, a house may have a single user interface that is used to set a single target temperature for some or all rooms or locations in the house.

It is common for different locations in a house to be at different temperatures, particularly in rooms that receive more or less incident sunlight, are on different floors of the house or are otherwise subject to different thermal environments or thermal conditions. By installing an ambient energy distribution system between such locations, heat energy may be transferred from one location to another. For example, if one location has an ambient temperature higher than the target temperature and another location has an ambient temperature lower than the target temperature, as sensed by environmental sensors 112 installed in the respective locations, relatively warm air may be blown from the relatively warmer location to the relatively cooler location through an air circulation system under the control of a control unit 106. In some embodiments, additional criteria may be incorporated in an actuation condition. For example, air circulation system may be operated only if the temperature differential between two locations exceeds a selected difference threshold, or if one or both of the locations have an ambient temperature that differs from the target temperature by a selected threshold, or a combination of conditions.

In some embodiments, one or more of a user interface 108, an environmental sensor 112 and a control unit may be combined in a single unit. The control unit in such a thermostat may, in a manner similar to control unit 106, control the operation of a primary distribution system as well as an air circulation system.

It will be appreciated that the user interface may be a single integrated thermostat that controls both the ambient energy distribution system 104 and the HVAC system 102. Alternately, the user interface may be remote from the thermostat (which may be located anywhere in the building). Alternately, if the thermostat is provided at one location, a user interface may be part of the thermostat and separate user interfaces may be provided on one or more other locations.

Figure 2:
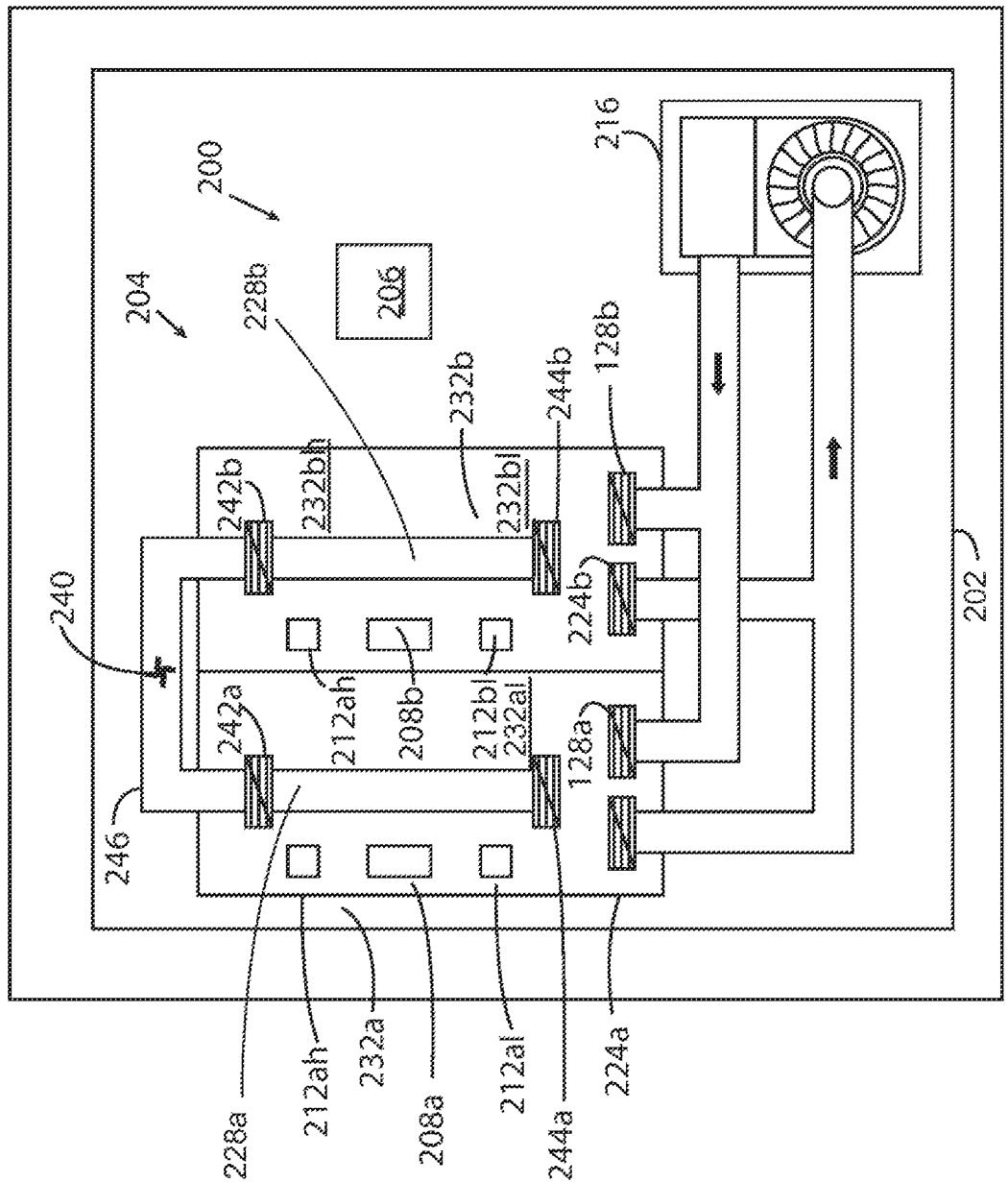
FIG. 2 illustrates another environmental control system that allows heat to be selectively distributed within a location as well as between locations.

Reference is next made to FIG. 2, which illustrates an HVAC system 200 according to another example embodiment. System 200 is similar in structure and operation to system 100 and elements of system 200 that correspond to element of system 100 are generally identified by corresponding reference numerals.

System 200 includes a HVAC system 202, an ambient energy distribution system 204, a control unit 206, one or more user interfaces 208 and one or more environmental sensors 212. In FIG. 2 (and some of the following figures), couplings between the control unit and various controlled or controllable elements are not illustrated to simplify the drawings.

In system 200, the rooms in the structure have multiple locations within them. Location 232*ah* is the upper or higher portion of a room 232*a*. Location 232*al* is the lower portion of room 232*a*. Similarly, locations 232*bh* and 232*bl* are respectively the higher region and lower region in room 232*b*. The air circulation system 204 includes a vent 242*a* in location 232*ah* and a vent 244*a* in location 232*al*. Vent 242*a* is positioned, e.g., on a wall in a relatively high position (i.e. relatively closer to a ceiling) or in the ceiling. Vent 244*a* is positioned below vent 242*a* in a relatively low position (i.e. relatively closer to a floor). Ducting 228*a* extends between vents 242*a* and 244*a*. Similarly, in room 232*b*, a high vent 242*b* is positioned in location 232*bh* above a low vent 244*b* in location 232*bl* and ducting 228*b* extends between vents 242*b* and 244*b*. Ducting 228*a*, 228*b* is in fluid communication with ducting 246, thereby providing a continuous air flow path throughout the air circulation system 200 from low vent 244*a* in location 232*al* to low vent 244*b* in location 232*bl*.

Figure 3B:
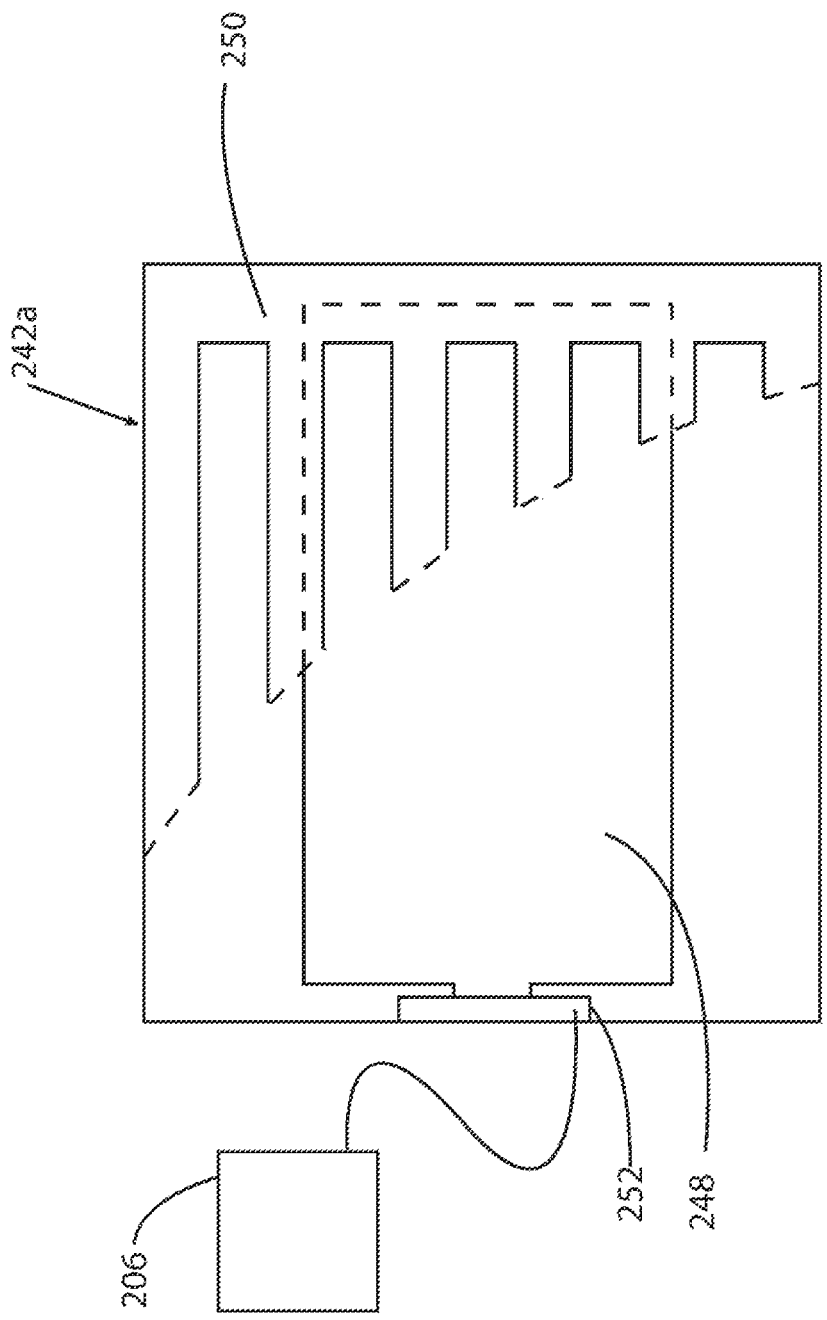
Figure 3C:
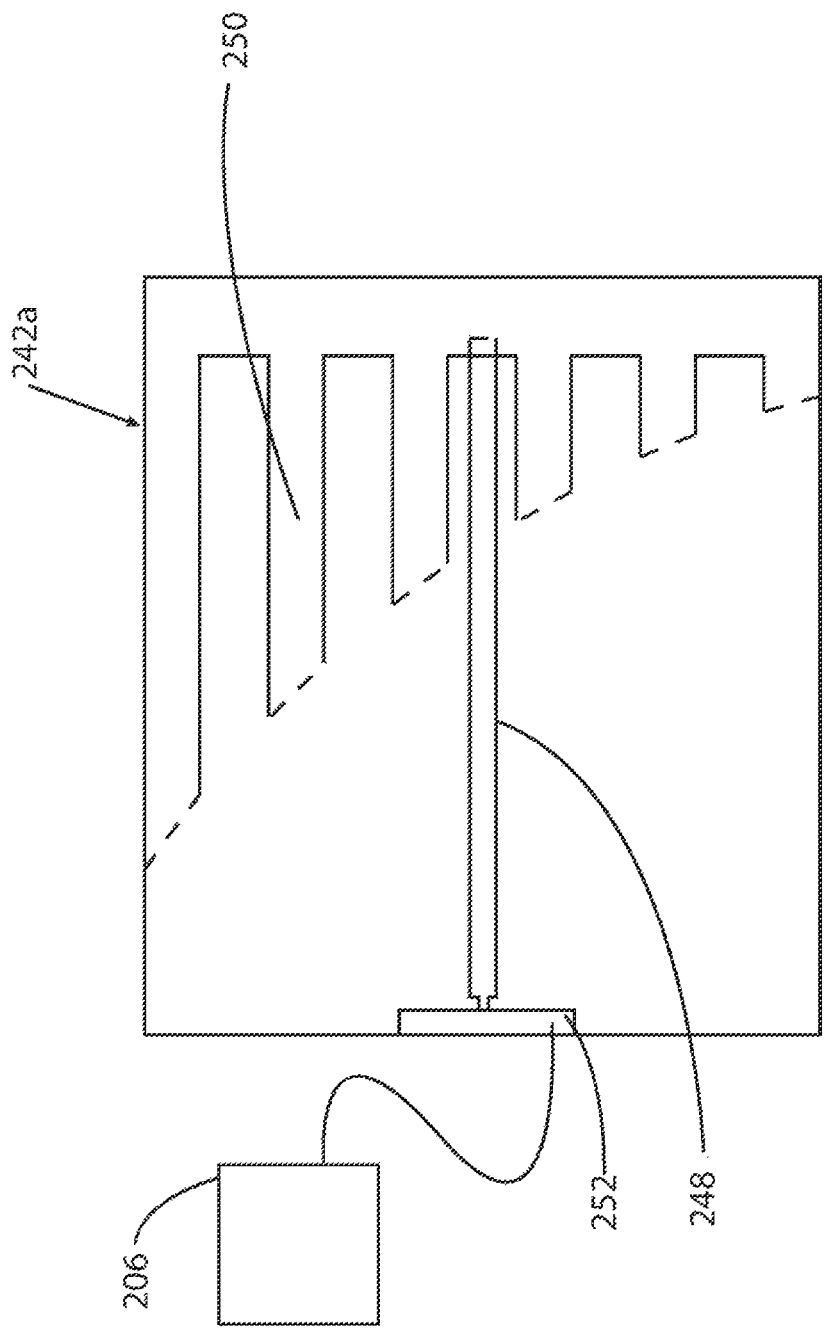

Referring to FIGS. 3*a*, 3*b* and 3*c*, vent 242*a* may include a vent grille 250 and a controllable damper 248 that can be positioned to allow or restrict a selected amount of airflow through vent 242*a* and a damper positioning motor 252. Damper 248 is connected to motor 252, which can rotate damper 248 to various positions between a fully or substantially closed position and a fully or substantially open position. Motor 252 is coupled to control unit 206, which transmits a damper control signal to the motor to control the position of damper 248 and thereby regulates the amount of airflow through vent 242*a*. FIG. 3*a* illustrates damper 248 in a closed positioned in which airflow is substantially restricted through vent 242*a*. FIG. 3*c* illustrates damper 248 in a fully or substantially open position in which airflow is substantially free through vent 242*a*. Damper 248 may be positioned in a partially open or intermediate position, as illustrated in FIG. 3*b*, allowing a controlled amount of airflow through vent 242*a*.

Referring again to FIG. 2, each of vents 242 and 244 may be provided with a damper and the dampers may be independently controllable dampers 248 in a manner similar to vent 242*a*, allowing the control unit 206 to independently control airflow through each of the vents 242, 244 in the air circulation system. FIG. 2 illustrates that these vents may be controlled using a diagonal line on the vents. Supply vents 228 and return air vents 224 may optionally similarly have controllable dampers that are coupled to control unit 206 to regulate the amount of air flowing between HVAC device 216 and each room 231 or location 232.

In some rooms or places, air in a higher location, near the ceiling and closer to a high vent 242, may be warmer than air in a lower location, near the floor and closer to a low vent 244. Air circulation system may be operated to selectively blow air from or into a lower or higher location by controlling the operation of blower 240 and the settings of dampers 248 in the respective high vents 242 and low vents 244.

In system 200, an environmental sensor 212 may be installed in each location as exemplified. Environmental sensor 212*ah* is installed in location 232*ah* and environmental sensor 212*al* is installed in location 232*al*. Environmental sensors 212*bh* and 212*bl* may be similarly installed at locations 232*bh* and 232*bl*. Each environmental sensor includes a temperature sensor, allowing air temperatures in high and low regions of room 232*a* and 232*b* to be measured and reported to control unit 206 independently.

Typically different air distribution strategies or profiles may be used in response to various actuation conditions. For example, if the target temperature is higher in one location than another, then ambient energy distribution system 204 may be used to transfer heat from one location (e.g., the upper portion of a room) to another location (a lower portion of the room). Such a condition may occur in winter when more heat may be desired in the lower portion of a room (e.g., chest or head height) as opposed to adjacent the ceiling, particularly in houses with a high ceiling (e.g., a 10 or 12 foot ceiling). In such a case, the actuation conditions may be as follows:

(i) the ambient temperature in location 232*ah* (as sensed by environmental sensor 212*ah* and reported to control unit 206) is higher than the target temperature for room 231*a* (as set by a user at user interface 208*a*); and/or (ii) the ambient temperature in location 232*bl* is lower than the target temperature for room 231*b*; and/or (iii) the ambient temperature in location 232*ah* is higher than the target temperature for room 231*b*, then control unit 206 may determine that there is an excess of heat in the upper region of room 231*a* and a deficit of heat in room 231*b*.

The control unit may:

(a) open dampers 248 in vents 242*a* and 244*b*;
(b) close dampers 248 in vents 242*b* and 244*a*; and
(c) activate blower 240 to blow air from room 231*a* to room 231*b*.

This will blow relatively warm air from the higher region of room 232*a* to the lower region of room 232*b*.

Alternately, if a blower is provided between vents 242*a* and 244*a* (and optionally vents 242*a* and 242*b* are not connected by ducting or the connecting transverse duct is closeable, such as by dampers), then the actuation conditions may be as follows: (01 the ambient temperature in location 232*ah* (as sensed by environmental sensor 212*ah* and reported to control unit 206) is higher than the target temperature for room 231*a* (as set by a user at user interface 208*a*); and/or (ii) the ambient temperature in location 232*bl* is lower than the target temperature for room 231*b*;

then control unit 206 may determine that there is an excess of heat in the upper region of room 231*a* and a deficit of heat in a lower portion of room 231*a*.

The control unit may:

(a) open dampers 248 in vents 242*a* and 244*a*;
(b) close dampers 248 in vents 242*b* and 244*b* (if a transverse duct is provided); and
(c) activate a blower located between vents 242*a* and 244*a* to blow air from the upper portion of room 231*a* to the lower portion of room 231*a* or vise versa.

This will blow relatively warm air from the higher region of room 231*a* to the lower region of room 231*a*.

Similarly the ambient energy distribution system could be used to transfer warmer area within a room from one location to another location in a room (e.g, the front part of a room adjacent a window which is heated by sunlight to a location in the room distal to the window) or from one room (e.g., a room which has a high level of incident sunlight) to another room which has less incident sunlight.

It will be appreciated that the direction of flow may vary during a day. For example, the front of a house or apartment may receive more incident light in the morning and therefore the ambient energy distribution system may transfer warmer air to a rear part of the house or apartment which has less incident sunlight. The rear part of the house or apartment may receive more incident sunlight in the afternoon. Therefore, in the afternoon, the ambient energy distribution system may transfer warmer air to a front part of the house or apartment which has less incident sunlight.

It will be appreciated that the ambient energy distribution system may alternately be operated to move cooler air to a part of a room, house or apartment which requires more cooling. Such a condition may occur in the summer. Such an alternate actuation conditions could be as follows:

(i) the ambient temperature in location 232*al* (as sensed by environmental sensor 212*al* and reported to control unit 206) is lower than the target temperature for room 232*a* (as set by a user at user interface 208*a*); and/or (ii) the ambient temperature in location 232*al* is higher than the target temperature for room 232*a*;

then control unit 206 may determine that there is an excess of cooler air in the upper region of room 231*a* and a deficit of cooler air in the lower region of room 231*a*.

The control unit may:
(a) open dampers 248 in vents 242*a* and 244*a*;
(b) close dampers 248 in vents 242*b* and 244*b* (if a transverse duct is provided); and
(c) activate a blower located between vents 242*a* and 244*a* to blow air from the upper portion of room 231*a* to the lower portion of room 231*a* or vise versa.

Similarly, cooler air may be moved from one room (e.g., a room having less incident sunlight) to another room (e.g., a room with more incident sunlight), or from a location in a room having relatively cooler air to a location in another room of the same room having relatively warmer air.

Various other actuation conditions may be defined and control unit 206 may respond to the various actuation conditions to activate various air distribution (or air circulation) strategies or profiles in response to such conditions. Some actuation conditions may result in heat energy being transferred from a higher location in a room to a lower location in the same room to provide air circulation and to equalize the temperature within the room. The actuation conditions and air distribution strategies may be adapted for use for different heating and cooling environments and different seasons or times of the year. Optionally, the system could be used to move heat from one floor in a house to one or more other floors. For example, in the summer, the system could be used to move cooler air from a basement to one or more above ground floors and optionally to the top floor in a house. In the winter, hotter air that accumulates above ground, such as in the upper floor of a house, could be moved to one or more lower floors and optionally to the basement of a house. It will be appreciated that ambient energy distribution system 404 may use HVAC ducting or a liquid sub-loop as disclosed herein.

Figure 4:
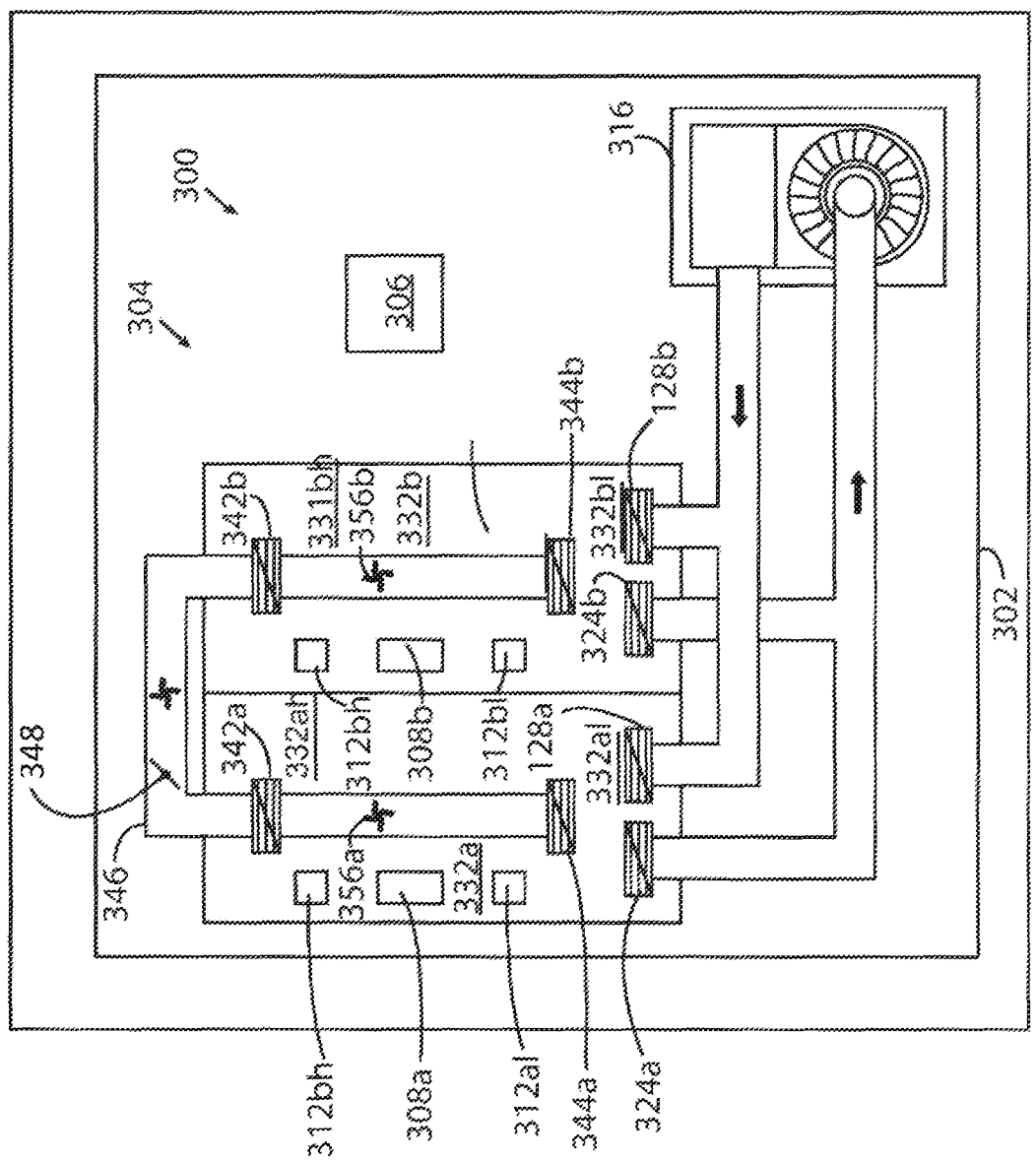
FIG. 4 illustrates another environmental control system that allows heat to be selectively transferred within and between locations.

Reference is next made to FIG. 4, which illustrates another system 300 according to another example embodiment. System 300 is similar to system 200 and elements of system 300 that correspond to elements of systems 100 or 200 are generally identified by corresponding reference numerals.

System 300 includes an HVAC system 302, an ambient energy distribution 304, a control unit 306, one or more user interfaces 308 and one or more environment sensors 312.

Ambient energy distribution system 304 includes a plurality of blowers 356 in ducting 346. Blower 356*a* is positioned between vents 342*a* and 344*a*. Similarly, blower 356*b* is positioned between vents 342*a* and 344*b*. Each of the blowers 356 may be operated bidirectionally to blow air toward the corresponding higher vent 342 or towards the corresponding lower vent 344. Each blower 356 is coupled, e.g., to control unit 306 which can activate and control the speed of each blower independently.

Blowers 356 may be used to provide air circulation and heat energy distribution within a room 331.

For example, if dampers 348 in vents 342*a* and 344*a* are both at least partially open and blower 356*a* is activated to blow air from vents 342*a* and 344*a*, air will blow from location 332*ah* to location 332*al*, which may help maintain a more consistent temperature in room 331*a*.

Ambient energy distribution system 304 may also include one or optional dampers 348 in ducting 346. Damper 348 is positioned between rooms 331*a* and 331*b*. Damper 348 is coupled to control unit 306, which may position damper 348 in a fully open, fully (or substantially) closed or in an intermediate position, thereby controlling the flow of air between locations 332. For example, if damper 348 is closed, in this example embodiment, locations 332*a* and 332*b* will be substantially fluidically isolated (at least with respect to fluid communication through ducting 346). Blowers 356 may be operated independently to selectively and independently provide air circulation within the isolated locations, allowing air to be circulated in a room without substantial mixing of air between the rooms. This may be desirable, for example, in structures where one location may, at times, contain contaminants such as dust or aromatic substances and it may be desirable to prevent the mixing of contaminated air into other locations within the structure.

In some embodiments, additional air processing equipment may be installed in an air circulation system. For example, an air cleaning or air filtration system (not shown) may be installed within the ducting 346 or may be integrated with a vent 342 or 344. Examples of such air processing systems may include ultraviolet (UV) light air purifiers, HEPA filters, ionizers and air deodorizers. Such air processing systems may be coupled to the system control unit, which can then coordinate the operation of the air processing system with other components of the HVAC system.

In systems 100, 200 and 300, the air circulation system is combined with a forced air HVAC device 116, 216, or 316 respectively. In other embodiments, the HVAC device may pump another heated or cooled fluid, such as water to some or all of the various locations in a structure to heat or cool the locations. In some embodiments, an HVAC device may be provided directly in one or more locations. For example, a location may have an in-room electric heater and/or air conditioning unit. The HVAC device(s) may be coupled to the control unit which can then coordinate the operation of the HVAC device(s) and the air circulation system.

Figure 5:
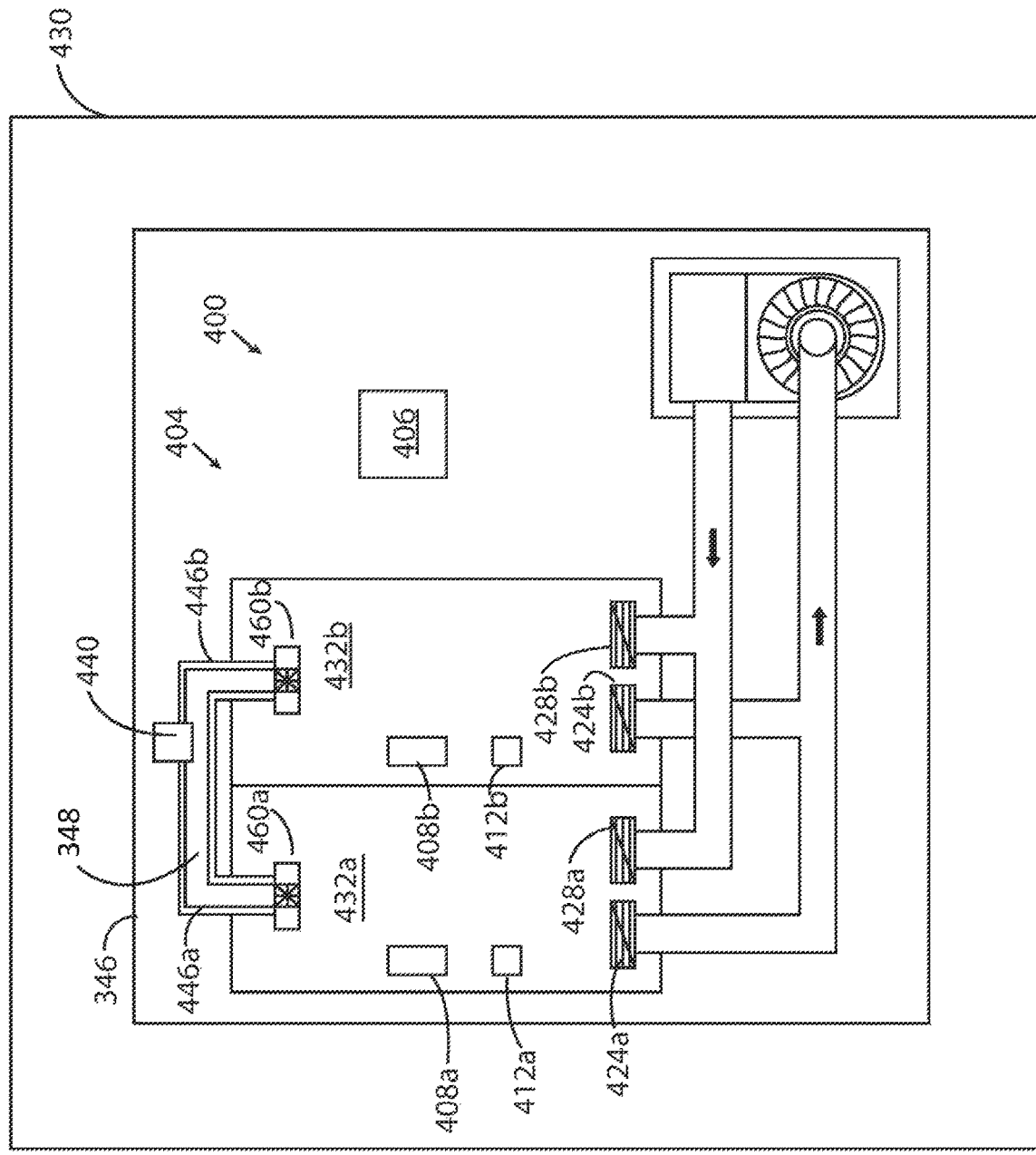
FIG. 5 illustrates another environmental control system that allows heat to be transferred between locations using a thermal fluid.

Reference is next made to FIG. 5, which illustrates an environment control system 400 according to another embodiment. System 400 is similar in structure and operation to the environmental control systems described above and elements of system 200 that correspond to element of the other environmental control systems are generally identified by corresponding reference numerals.

System 400 includes an HVAC system 402, an ambient energy distribution system 404, a control unit 406, one or more user interfaces 408 and one or more environmental sensors 412. Ambient energy distribution system utilizes a liquid to convey heat from one location to another. As opposed to a radiator system in a house which conveys heat via a piping system from a furnace throughout a residence, ambient energy distribution system 404 may be used concurrently with a primary distribution system 102 to convey excess heat from one location to one or more other locations. It will be appreciated that a series of ambient energy distribution systems 404 may be provided. Each ambient energy distribution system 404 may be considered a separate sub-loop in a residence having a primary distribution system 102. An advantage of a sub-loop system is that it avoids the use of ducting which may be difficult to run between rooms or within a room. A liquid sub-loop may use piping (e.g., 0.5, 1.0, 1.5 inch piping) to convey a liquid. This piping and heat exchanges may be easily installed between wall studs. Also, each sub-loop may contain only a few litres of water. Therefore, in case of a leak, only a small amount of water may be lost minimizing any water damage that may occur.

Ambient energy distribution system 404 includes a first ambient heat exchanger 460*a* in a first location 430*a* and a second ambient heat exchanger 460*b* in second location 430*b*. First and second ambient heat exchangers 460*a*, 460*b* are connected by a pair of water pipes 446*a*, 446*b*. A pump 440 can pump water in either direction in pipe 446*a*. The first and second heat exchangers 460, pipes 446 and pump 440 form a closed fluid system in which water can flow from heat exchanger 460a to heat exchanger 460b and vice versa. The rate of flow of the water is controlled by pump 440, which is coupled to and operates under the control of control unit 406. Heat exchangers 460 allow heat energy to be exchanged between the water in circulation system 404 and the surrounding air in corresponding locations 430. Heat energy can be transferred from a warmer location to a cooler location by being absorbed at the heat exchanger in the warmer location and then released at the heat exchanger in the cooler location, under the control of the control unit 406. In some embodiments, ambient energy distribution system 404 may include one or more temperature sensors to detect the temperature of the water at different points in the system. The temperature sensors would be coupled to control unit 406 to report the temperature of the water at different points in the system, allowing that information to be used in controlling the operation of heat circulation system 404.

Ambient energy distribution system 404 allows heat energy to be transferred between locations in a structure without transferring air between locations, thereby avoiding mixing of air between the locations. Ambient energy system 404 may include multiple heat exchangers in multiple locations within a room in a structure, as is illustrated and described in relation to HVAC system 300, to allow heat energy to be distributed more evenly within a room. In addition, an ambient energy system using a thermal fluid running in conduits may extend between three or more locations and may include multiple fluid pumps to transfer heat between different combinations of locations. Such a system may also include one or more valves to isolate one or more locations to create different sub-loops to allow different heat transfer operations to take place between different groups of locations.

In system 400, water is used as a thermal fluid to absorb heat in one location, transport heat to another location and to release heat in the other location. In other embodiments, other thermal fluids, including various liquids, gases and vapors may be used.

In another embodiment, it will be appreciated that primary distribution system 110 may alternately, or in addition, utilize water pipes to conduct heat between HVAC device 116 and one or more rooms or locations. An advantage of such a design is that water pipes occupy less space than HVAC ducting.

Figure 6:
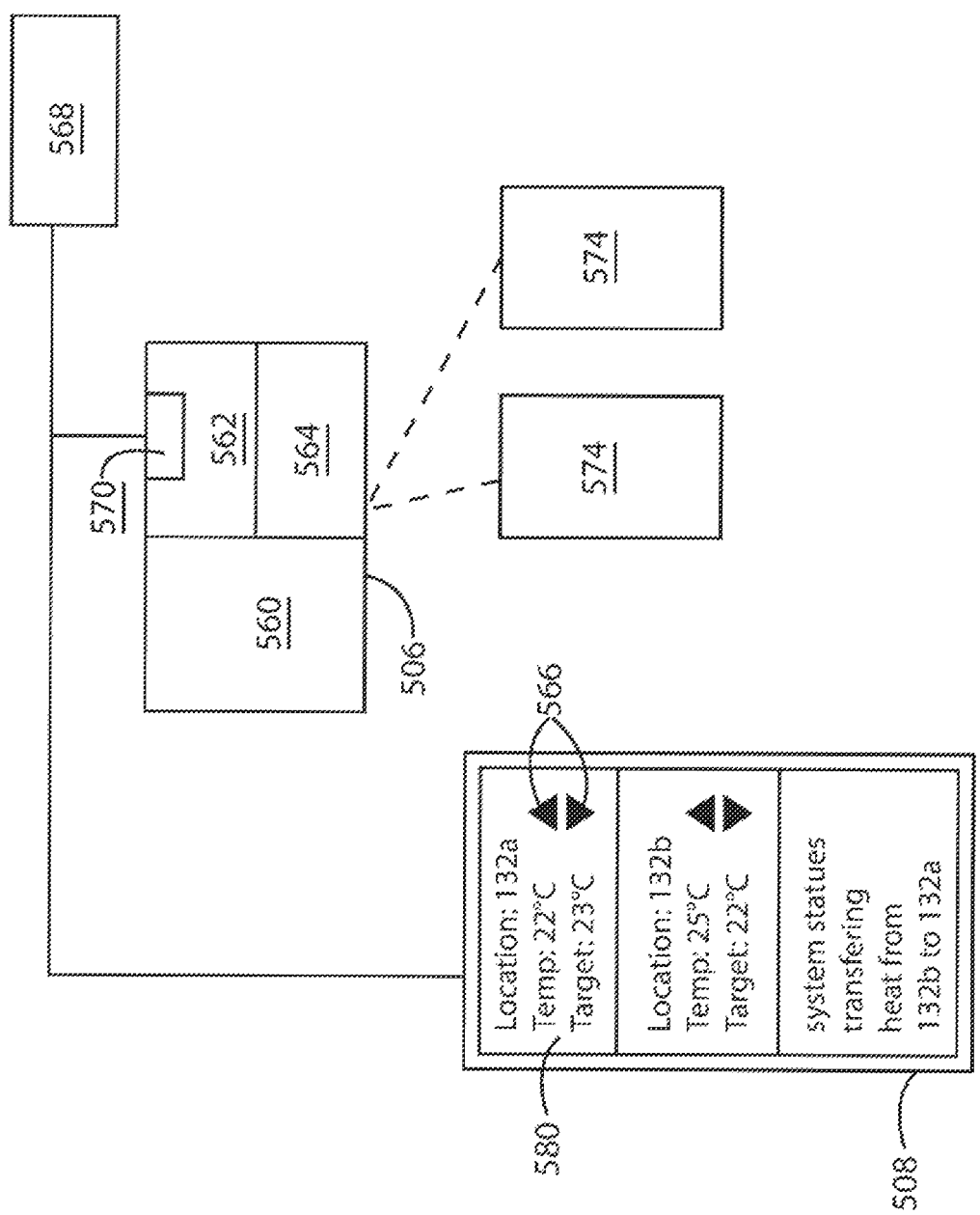
FIG. 6 illustrates a user interface and a control unit coupled to a system monitor.

Reference is next made to FIG. 6, which illustrates a control unit 506, a user interface 508 and an environmental sensor 512, each of which may be used with the HVAC systems described above. Control unit may be located at any location and optionally is provided as part of a HVAC device 116.

Control unit 506 includes a microcontrol unit 560, a system communication interface 562 and a local communication interface 564. User interface 508 includes a display screen 564 and one or more input devices 566, which may be buttons, a touch interface, sliders, dials or other input devices. In some embodiments of a HVAC system, a control unit may be assembled together with a user interface.

System communication interface 562 provides a secure communication interface for the control unit to communicate with a system monitor 568 and other remote devices. Secure communication interface 562 includes a firewall 570 which prevents unauthorized devices from accessing control unit 506 and taking control of an environmental control system. Firewall 570 may be a software firewall or a hardware firewall. Firewall 570 is configured to allow only authorized devices to access control unit 506. In various embodiments, different groups and types of devices may be authorized to access control unit 506 through firewall 570.

Local communication interface 564 provides a secure communication interface for control unit 506 to communicate with one or more local user devices 5741, which may be in the vicinity of control unit 506, such as smartphones, computers and wireless user interfaces (e.g., located within the same building or residence in a building as the HVAC device 116). Local communication interface 564 may, for example, be a WiFi network, a Bluetooth communication interface or any other standard or proprietary wired or wireless communication interface. In various embodiments, a control unit may include multiple local communication interfaces to allow various local devices to be coupled through. Local communication interface 564 is secured to permit only authorized devices to access control unit 506. The security protocol will depend on the particular local communication interface. For example, a WiFi network may be secured with a passkey, MAC address control and by other means; a Bluetooth network may be secured using authenticated pairing and encryption techniques; and other types of networks may be secured using appropriate techniques. In some embodiments, the local communication network 564 may be selected or configured to allow only external devices that are physically connected to the network or which are in within a limited communication range or proximity of a router or modem.

Optionally, in another embodiment, which may be used with any embodiment disclosed herein, a smartphone or other local user device 574 may communicate with microcontrol unit 560 (e.g., via firewall 570) or via local communication interface 564 or via any other available network and may be used to control or temporarily control a HVAC device 116. Accordingly, local user device 574 may be used to control the HVAC device 116, such as by programming or reprograming the control unit 506 or temporarily overriding the programming in the control unit 506. In any such case, the interface 564 may display current conditions. By way of example, if a user is away from the user's home, the user may use their smartphone to communicate with the microcontrol unit 560 via the internet and firewall 570 so as to override programming, if any, in microcontrol unit 560, at least on a temporary basis. It will be appreciated that in such an embodiment, the local communication interface 564 may display current conditions in the home and/or the current programmed conditions. In this way, a user may use a smart phone to program or reprogram the HVAC device 116 by communicating with the microcontrol unit 560, which may be part of the HVAC device 116. Information from the microcontrol unit 560 may be sent to the user interface 564 for display (e.g., so that a person in the home may know the current setting of the HVAC device 116) and any information captured by the user interface 564 (e.g., from sensors provided as part thereof or communicating therewith) may be sent from the user interface 564 to the microcontrol unit 560, which may then communicate information to the user's smart phone (e.g., so that the user is aware of the current conditions in the home). Accordingly, there may be no direct communication from the smart phone to the user interface 564. Instead, the communication may occur via the microcontrol unit 560 and the firewall or directly from the user interface to the firewall. A user may therefore use their smart phone determine the temperature in the home or a part of the home (if there are multiple user interfaces or sensors throughout the home) and/or to manually turn the heat up or down by, e.g., a touch screen of the smart phone.

Reference is made to FIG. 7a, which illustrates an example arrangement of multiple environmental control systems 600 and a system monitor 668. The environmental control systems 600 may be similar in structure and operation to the system described above, and elements of the systems 600 that correspond to elements of the above systems are generally identified by corresponding reference numerals.

The environmental control systems 600 may be installed in various structures and in various units of a multi-unit structure. In this example, one environmental control system is installed in a detached dwelling structure 680. Two environmental control systems are installed in different apartment units 684 in an apartment building 682.

In each environmental control system 600, a plurality of HVAC system devices (such as HVAC devices, ambient energy moving members, dampers, user interfaces etc.) are coupled to the control unit 606 through firewall 670. In addition, system monitor 668 is coupled to control unit 606 through firewall 670. One or more local user devices 674l may be coupled to control unit 606 through local communication interface 664. In addition, one or more external user devices 674e may be coupled to control unit 606 through firewall 670 and, optionally, through system monitor 668, allowing a user to control an environmental control system.

Accordingly, a person located with apartment unit 684a may use their smartphone, computer or the like to control the HVAC system in apartment unit 684a. Similarly, a person located with apartment unit 684b may use their smartphone, computer or the like to control the HVAC system in apartment unit 684b. At times, the user may be outside their dwelling unit (e.g., apartment unit 648a) or outside the apartment building. In such a case, the user may use the same device or an alternate smartphone, computer or the like to operate control unit 606 for their dwelling (e.g., apartment unit 684a) by accessing the control unit in their apartment unit 684a via firewall 670.

Accordingly, a particular user device may be a local user device 674l when it is physically present within a structure and coupled to a controller through a local communication interface and an external user device 674e at other times when it is coupled to the controller through an external communication interface.

Typically, access to an environmental control system will be limited to users that reside in, work or otherwise have an interest in a location. In some cases, a user may be able to observe the status and control an entire environmental control system for a structure. In other embodiments, particular users may be able to observe and control only aspects of an environmental control system relevant to one or more selected locations within a structure.

Reference is made to FIG. 7b, which illustrates another example arrangement of multiple environmental control systems 600 and a system monitor 668. In this arrangement, the HVAC devices in each environmental control system 600 communicate with their respective control unit through system communication interface 662 inside the firewall 570. System monitor 668 is coupled to control unit 506 through firewall 570.

Reference is made to FIG. 7c, which illustrates another example arrangement of multiple environmental control systems 600 and a system monitor 668. In this arrangement, the HVAC devices in each environmental control system 600 are coupled to the control unit through local communication interface 664.

The coupling of HVAC devices to a control unit may vary from one environmental control system to the next, as is illustrated in FIG. 7a-7c. In various arrangements, HVAC devices may be coupled to a control unit in different ways, with varying types and levels of security.

User devices 674 may be programmed or configured with a graphical user interface that allows a user to view status information regarding ambient conditions in a structure and to view the operating status and conditions of an environmental control system. For example, a user may be able to view ambient temperature and other environmental conditions in locations where an environmental sensor is installed. A user may be able to see whether a particular HVAC system or ambient energy distribution system is operating and, if so, its specific operating mode. User may also be able to enter target temperature information for locations.

System monitor 668 may be in communication with, and may control, a plurality of environmental control systems. For example, in a multi-unit structure, such as an apartment building with multiple apartment units or a commercial building with multiple commercial units, an environmental control system may be installed in each unit. The control unit in each environmental control system may be coupled to and in communication with a system monitor 668, which may control the operation of the environmental control systems. For example, system monitor 668 may be configured to adapt the operation of environmental control systems based on current or expected weather, current or expected electrical power availability or cost or other factors. In some embodiments, the system monitor 668, may track weather and send a monitor control signal to some or all control units to reduce or stop the use of heating or air conditioning functions in their respective environment control systems. This may be done, for example, if the system monitor expects the outside temperature to fall from a relatively high temperature to a relatively low temperature where air conditioning will not be required. The system monitor may instruct the control unit in each HVAC system in a structure to stop use of any air conditioning element in its respective HVAC device for a period of time or until the following day or until use of air conditioning is permitted by the system monitor. This will typically result in reduced energy consumption in the structure as a whole. System monitor 668 may also gather and analyze usage data from each control unit regarding the operation of its respective environmental control system. A control unit in an environmental control system may increase usage of an ambient energy distribution system when the usage of heating or cooling functions in an HVAC system has been reduced by a system monitor. For example, a system monitor may limit the energy used by an HVAC system or by a group of HVAC systems in a multi-unit structure in order to reduce energy costs or to reduce peak power consumption across multiple environmental control systems, in a multi-unit structure or across multiple environmental control systems in multiple structures.

Environmental sensor 512 may include a temperature sensor 560 and a humidity sensor 562.

In other embodiments, an environmental sensor may include other sensors, a sunlight sensor, a dust sensor, particle sensor, ion sensor, gas sensor (which may detect one or more specific gases such as carbon monoxide or radon).

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An environmental control system for a unit in a structure, the unit comprising a first room and a second room, the environmental control system comprising: (a) a primary distribution system comprising a primary thermal transfer conduit system, the primary thermal transfer conduit system comprises a supply end in thermal communication with a source of at least one of heating or cooling and a first primary distribution end in the first room in the structure wherein, in operation, the primary distribution system provides the heating or cooling to the first room; and, (b) an ambient energy distribution system extending between the first room and the second room and comprising a fluid flow path which circulates a fluid for the heating or cooling from a first end in the first room and a second end in the second room wherein, in operation, the fluid flow path transfers heat between the first and second rooms whereby, in operation, the heat provided to the first room by the primary distribution system is transferred to the second room by the ambient energy distribution system, wherein the ambient energy distribution system is fluidically separate from the primary distribution system and, wherein the fluid flow path comprises a first heat exchanger positioned in the first room, a second heat exchanger positioned in the second room and a fluid flow member which circulates the fluid for the heating or cooling to the first heat exchanger and to the second heat exchanger and the fluid flow path and, wherein the fluid in the fluid flow path is circulated by the fluid flow member to the first heat exchanger positioned in the first room and the second heat exchanger in the second room whereby the heat is transferred between the first and second rooms.

2. The environmental control system of claim 1 further comprising a system monitor which adapts operation of the environmental control system of the unit based on current or expected weather, current or expected electrical power availability or cost.

3. The environmental control system of claim 1 wherein the fluid comprises a liquid and the fluid flow member comprises a pump.

4. An environmental control system for a structure, the environmental control system comprising: (a) a primary distribution system comprising a primary thermal transfer conduit system, the primary thermal transfer conduit system comprises a supply end in thermal communication with a source of at least one of heating or cooling and a first primary distribution end in a first room in the structure wherein, in operation, the primary distribution system provides the heating or cooling to the first room; (b) an ambient energy distribution system extending between the first room and a second location in the structure and comprising an ambient energy distribution conduit system, the ambient energy distribution conduit system extends between a first end in thermal communication with a first location in the first room and a second end in thermal communication with the second location in the structure, wherein, in operation, the ambient energy distribution conduit system transfers heat between the first and second locations whereby, in operation, the heat provided to the first room by the primary distribution system is transferred to the second location by the ambient energy distribution system, wherein the ambient energy distribution system is fluidically separate from the primary distribution system, wherein the ambient energy distribution system comprises a fluid flow path which circulates a fluid for the heating or cooling, a first heat exchanger positioned in the first location and a second heat exchanger positioned in the second location, and wherein the fluid in the fluid flow path is circulated between the first heat exchanger positioned in the first room and the second heat exchanger in the second location whereby the heat is transferred between the first room and the second location.

5. The environmental control system of claim 4 wherein the ambient energy distribution conduit system comprises an air flow duct and the ambient energy distribution system includes a controllable damper, wherein the controllable damper is coupled to a control unit and is adjusted by a signal issued by the control unit to regulate transfer of heat between the first and second locations.

6. The environmental control system of claim 4 wherein the ambient energy distribution system includes a controllable fluid moving member, wherein the controllable fluid moving member is coupled to a control unit and is adjusted by a signal issued by the control unit to regulate transfer of heat between the first and second locations.

7. The environmental control system of claim 4 further comprising:
   (a) a first temperature sensor that is provided at the first location and a first interface for the first location whereby an inputted first target ambient temperature for the first location, which is provided by the first interface, is communicated to a control unit, which is operably connected to the ambient energy distribution system, and a first temperature in the first room is communicated to the control unit; and,
   (b) a second temperature sensor that is provided at the second location and a second interface for the second location whereby an inputted second target ambient temperature for the second room, which is provided by the second interface, is communicated to the control unit and a second temperature in the second room is communicated to the control unit.

8. The environmental control system of claim 7 wherein the control unit is physically isolated from the interfaces and the temperatures sensors.

* * * * *